United States Patent [19]
Hemmi

[11] 3,719,949
[45] March 6, 1973

[54] ANTENNA PATTERN ROLL STABILIZATION
[75] Inventor: Christian O. Hemmi, Dallas, Tex.
[73] Assignee: Texas Instruments Incorporated, Dallas, Tex.
[22] Filed: Dec. 31, 1969
[21] Appl. No.: 889,568

[52] U.S. Cl..................................343/117, 343/7.4
[51] Int. Cl..................................................G01s 5/02
[58] Field of Search................343/117, 7.4, 756, 705

[56] References Cited

UNITED STATES PATENTS

| 3,156,915 | 10/1964 | Lang et al............................343/117 |
| 3,196,433 | 7/1965 | Barton et al.......................343/117 X |
| 3,042,917 | 7/1962 | Elhoff..................................343/117 |
| 2,604,698 | 7/1952 | Ewing...........................343/756.5 X |

FOREIGN PATENTS OR APPLICATIONS 890,264   1/1960   Great Britain....................343/756.5

*Primary Examiner*—Carl D. Quarforth
*Assistant Examiner*—J. M. Potenza
*Attorney*—Samuel M. Mims, Jr., James O. Dixon, Andrew M. Hassell, Harold Levine and Richards, Harris and Hubbard

[57] ABSTRACT

Elements of a phased array antenna are grouped and signals from the various groups are combined to produce an elevation difference signal and an azimuth difference signal. The elevation difference passes through circuitry having a control signal that varies with the cosine of the antenna roll angle and the azimuth difference signal passes through a circuit having a control input equal to the sine of the roll angle. The outputs of each of these circuits are combined to produce a roll stabilization signal.

10 Claims, 10 Drawing Figures

INVENTOR:
CHRISTIAN O. HEMMI

INVENTOR:
CHRISTIAN O. HEMMI

ANTENNA PATTERN ROLL STABILIZATION

This invention relates to antenna pattern stabilization, and more particularly to roll stabilization of a phased array antenna pattern.

In a tracking radar system, the coordinates of a target are measured to provide data which may be used to determine the target path and predict its future position. The antenna pattern commonly employed with tracking radar is the symmetrical pencil beam in which the elevation and azimuth beam widths are essentially equal. A pencil beam antenna pattern, however, is not suitable for tracking radar unless means are provided for determining the magnitude and direction of the target's angular position with respect to some reference direction. In mechanically scanned antennas, roll error correction of the antenna pattern is provided by a suitable mechanical drive coupled to the roll axis of the antenna dish. In a radar system using a phased array antenna, the use of a mechanical drive to correct for roll error defeats one of the principle advantages of such antennas, that is, solid state reliability.

An object of this invention is to electronically correct the roll error of the pattern of a phased array antenna. Another object of this invention is to provide for roll stabilization by combining an elevation difference signal and an azimuth difference signal. A further object of this invention is to provide roll stabilization of the pattern of a phased array antenna by characterizing an elevation difference signal by the roll angle and an azimuth difference signal also by the roll angle. Still another object of the invention is to provide for roll stabilization of the pattern from a phased array antenna by characterizing an elevation difference signal by the cosine of the roll angle and by characterizing the azimuth difference signal by the sine of the roll angle. A still further object of this invention is to provide a method of electronically rolling the difference pattern of a phased array antenna.

In accordance with one embodiment of this invention, the radiation pattern from an antenna is maintained along a preferred axis of orientation by generating a first radiation difference signal along a first axis. This first radiation difference signal is produced by combining signals from different sections of the antenna. A second radiation difference signal is also generated along an axis orthogonal to the first axis, again by combining signals from different sections of the antenna. Each of these generated difference signals is characterized by a correction signal that varies in accordance with the deviation of the antenna from a preferred orientation. These characterized signals are combined into a radiation pattern signal oriented along a preferred axis.

In accordance with a more specific embodiment of this invention, a radiation pattern from a phased array antenna is maintained along a preferred axis of orientation by generating a vertical difference radiation pattern signal by combining signals from selected elements of the antenna array. A horizontal difference radiation pattern signal is also generated by combining signals from selected elements of the phased array antenna. Both vertical correction and horizontal correction signals are generated with each signal related to the deviation of the phased array antenna from a preferred axis of orientation. The vertical difference signal is then characterized by the vertical correction signal and the horizontal correction signal is characterized by the horizontal correction signal. The two characterized signals are then combined into a roll stabilized radiation pattern signal oriented along a preferred axis.

A more complete understanding of the invention and its advantages will be apparent from the specification and claims and from the accompanying drawings illustrative of the invention.

Referring to the drawings:

FIG. 1 schematically shows an electronic roll stabilization network in accordance with the present invention;

Figure 6:
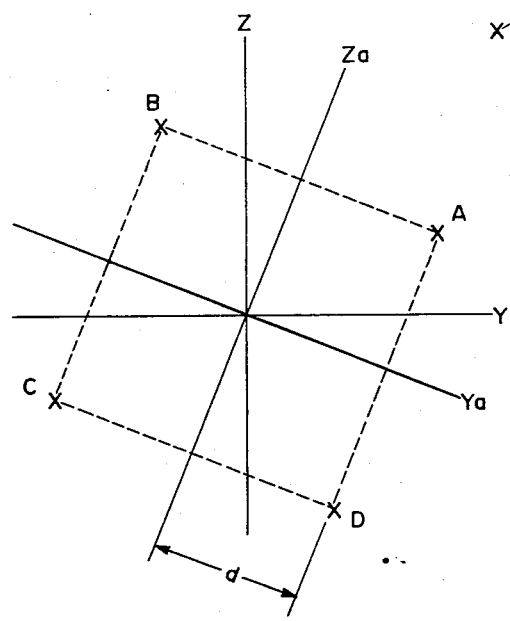
Figure 7:
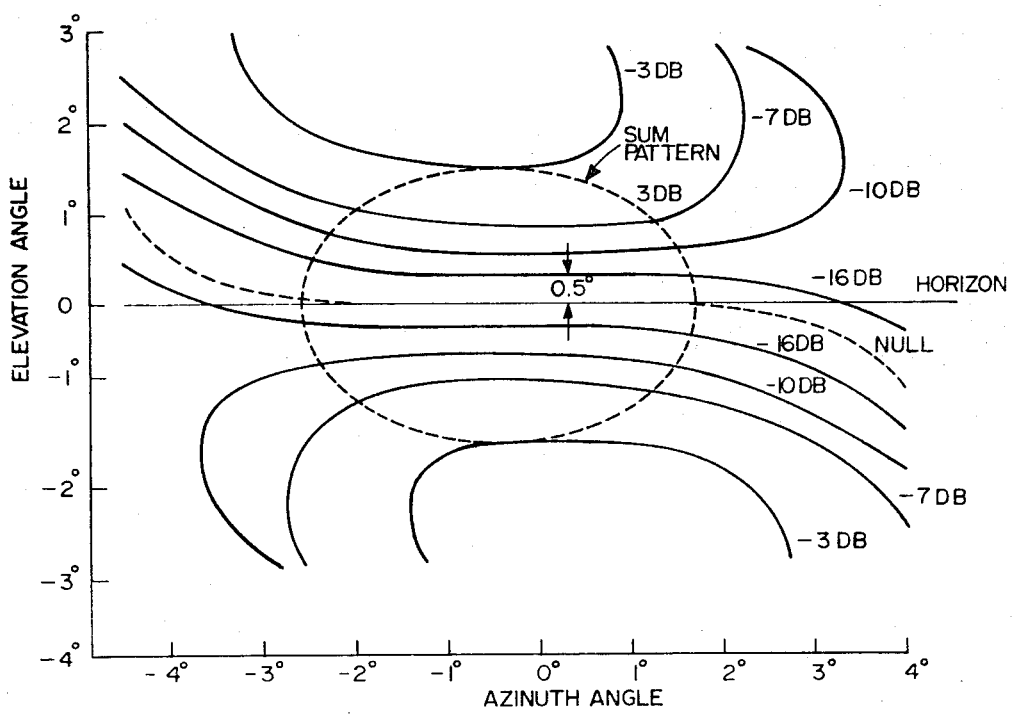
Figure 8:
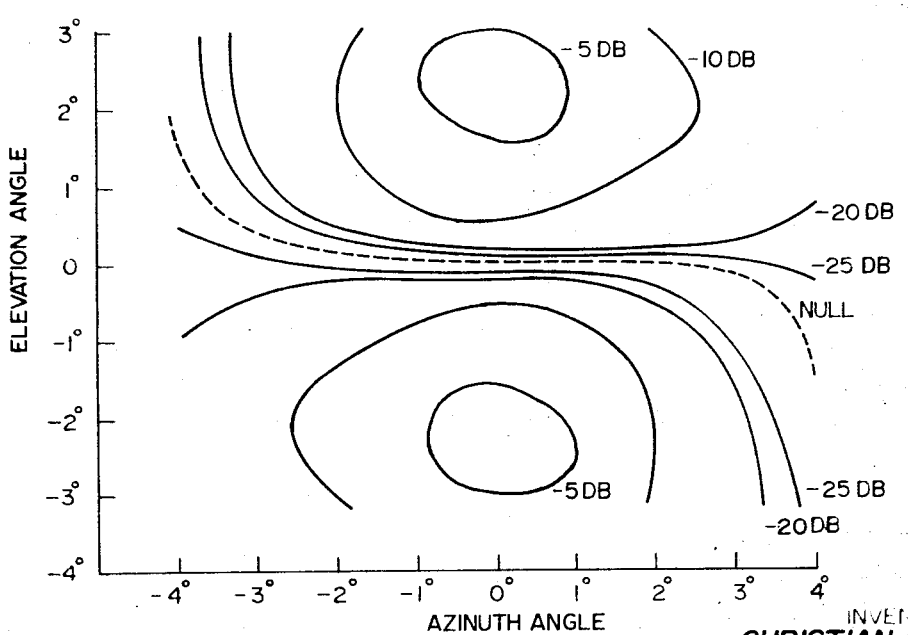
Figure 9:
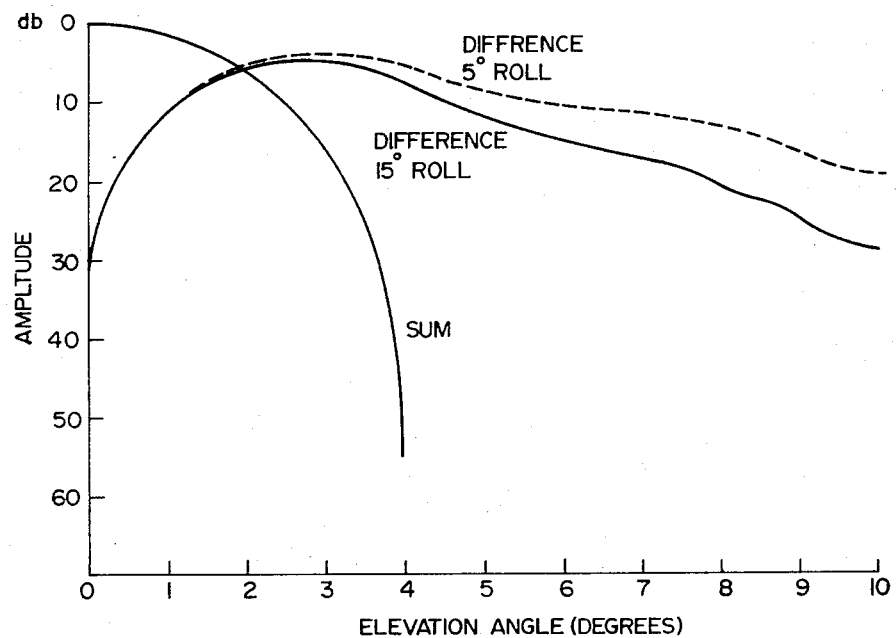
Figure 10:
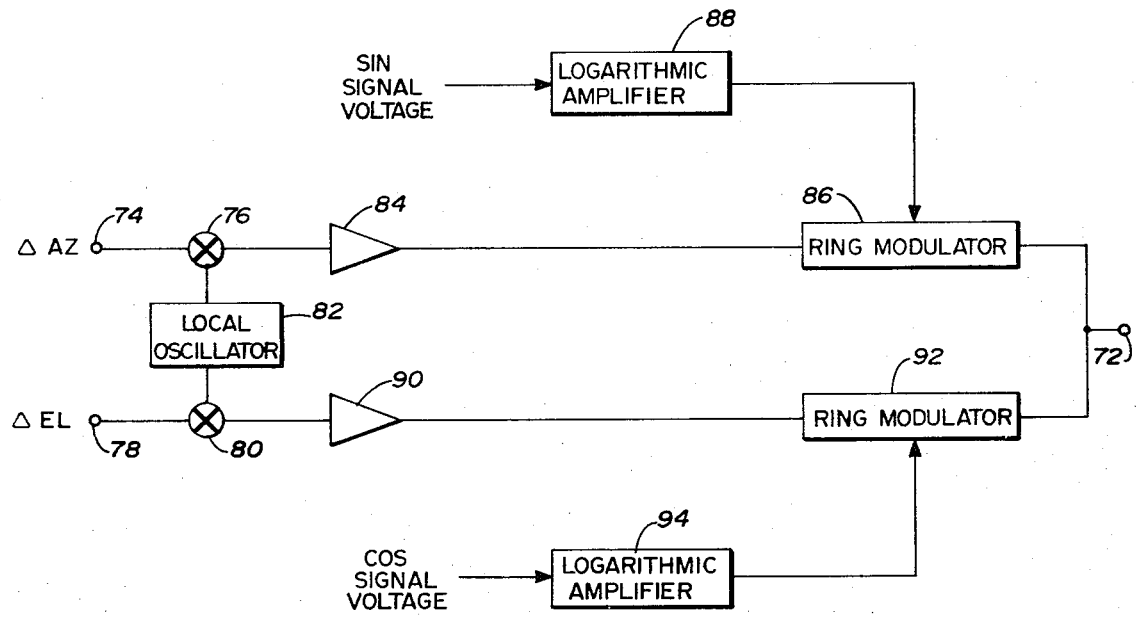

FIG. 6 schematically illustrates the geometry of a four element array;

FIG. 7 is a plot of elevation angle as a function of azimuth angles for a roll stabilized difference pattern for a four element array with 15° of roll;

FIG. 8 is a plot of elevation angle as a function of azimuth angle showing a roll stabilized pencil beam difference pattern for a multi-element antenna at a 15° roll angle;

FIG. 9 is a plot of amplitude as a function of elevation angle showing an elevation cut through the sum and difference pattern from an antenna array for various degrees of antenna roll; and FIG. 10 is a schematic diagram of a roll stabilization circuit operating at a 60 MHz intermediate frequency.

Figure 1:
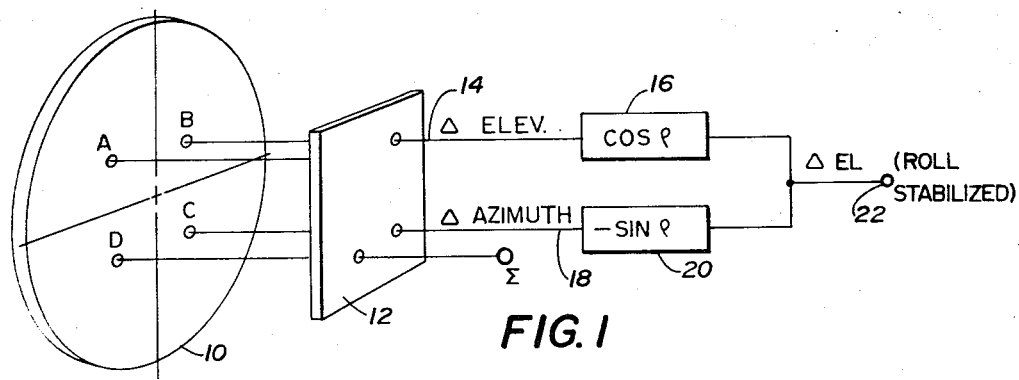

Referring to FIG. 1, a phased array antenna 10 produces target pattern information signals from each of four sections. These signals are applied to a monopulse processing network 12 of conventional design. The processing network 12 produces three output signals; one equal to the sum of the total energy received at each section of the antenna 10, a second equal to the horizontal difference, or difference in elevation, from the four sectors, and a third equal to a vertical difference, or a difference in azimuth, between the four sections. The elevation difference signal on line 14 is applied to a characterizing circuit 16 and the azimuth difference signal on a line 18 is applied to a characterizing circuit 20. Circuit 16 characterizes the signal on line 14 by a factor that varies in accordance with the cosine of the roll angle of the antenna 10 from a horizontal reference axis. Circuit 20 characterizes the signal on line 18 by a factor that varies with the sine of the roll angle. Output signals from the circuits 16 and 20 are combined to produce a roll stabilized elevation (horizontal) difference signal on a terminal 22.

Figure 2:
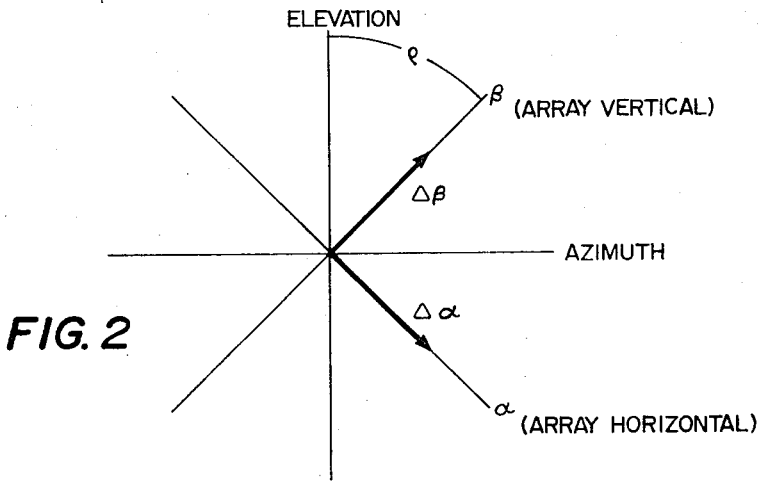
FIG. 2 is a geometrical interpretation of the array difference signals for electronic roll stabilization.

To generate a roll stabilized signal by combining the vertical and horizontal difference signals in the manner illustrated in FIG. 1, consider the coordinate system of FIG. 2. The error in the difference pattern signals produced at the output of the processing network 12 due to antenna roll may be written as follows:

$$\Delta \alpha = F(\sin \alpha_{beam} - \sin \alpha_{target})$$

$$\Delta \beta = F(\sin \beta_{beam} - \sin \beta_{target}) \quad (1)$$

where $\alpha$ and $\beta$ are the beam steering coordinates of the radiation pattern of the antenna 10. The beam steering angles of energy transmitted from the antenna 10 are the $\alpha_{beam}$ and $\beta_{beam}$ terms, and the target locating angles are the $\alpha_{target}$ and $\beta_{target}$ terms. For a thorough discussion of a system for generating the beam steering angles and processing the radiation at the target angles, reference is made to the U.S. Pat. No. 3,386,092 issued to T. M. Hyltin.

Consider that the desired error signal in terms of the angle of elevation of the radiating pattern from the antenna 10, referenced to a horizontal plane, is given by the equation:

$$\sin \phi = [\cos \epsilon][-\sin \rho (\sin \alpha) + \cos \rho (\sin \beta)] \quad (2)$$

where
$\rho$ = the roll angle,
$\phi$ = the elevation angle, and
$\epsilon$ = the pitch angle.

Since the $\cos \epsilon$ term does not affect the difference pattern of alignment, it can be neglected. From equations (1) and (2), and expression can be written for the roll stabilized difference elevation signal at the terminal 22 as follows:

$$\Delta el = -\sin \rho \, \Delta \alpha + \cos \rho \, \Delta \beta \quad (3)$$

where $\Delta el$ = the roll stabilized differential elevation signal. By similar analysis, an expressing can be written for a roll stabilized difference azimuth signal as follows:

$$\Delta az = \cos \rho \, \Delta \alpha + \sin \rho \, \Delta \beta \quad (4)$$

where $\Delta az$ = the roll stabilized difference azimuth signal. Accordingly, the roll stabilized difference azimuth signal may be generated by the system of FIG. 1 by changing the correction signals of the circuits 16 and 20.

Figure 3:
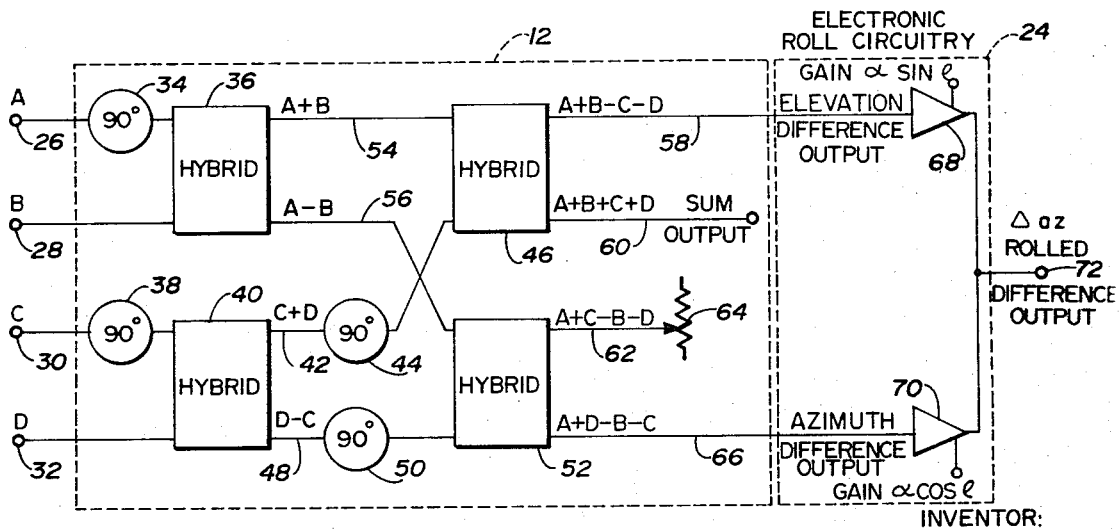
FIG. 3 is a schematic of an electronic roll stabilization system.

Referring to FIG. 3, there is shown in greater detail the processing network 12 and electronic roll circuitry 24. The circuit of FIG. 3 illustrates azimuth correction. Each of the four sections of the antenna 10 are connected to a separate input line of the processing network 12. Section A of the antenna connects to the input terminal 26, section B connects to the terminal 28, section C to the terminal 30, and section D to the terminal 32. Signals at the terminal 26 from section A are applied to a phase shift network 34 wherein a 90° phase shift is imparted to the signals. After having this additional 90° of phase shift added to the signals from section A, they are coupled to one input of a hybrid circuit 36. A second input to the hybrid circuit 36 is the signals from section B of the antenna 10. Hybrid circuit 36, and the other hybrid circuits of a processing network 12, are conventional circuits for mixing input signals applied thereto.

Antenna signals on the terminal 30 are applied to a phase shift network 38 and further passed to one input of a hybrid circuit 40. A second input to the hybrid circuit 40 are the signals from section D as applied to the terminal 32.

Hybrid circuit 36 generates two output signals, one equals to the sum of the signals from section A and section B, and the second equal to the difference between the signals from section A and the signals from section B. Similarly, the hybrid circuit 40 generates two output signals, one equal to the sum of the signals from the sections C and D and the second equal to the difference between the signals from sections D and C.

An output on line 42 from the circuit 40 is coupled through a phase shift network 44 to one input terminal of a hybrid circuit 46. The second output from the circuit 40 on line 48 is applied to a phase shift network 50. From the phase shift network 50, the difference signal on line 48 is applied to one input of a hybrid circuit 52. A second input to the hybrid circuit 46 is the sum output of the circuit 36 on line 54. The second input to the hybrid circuit 52 is the difference output of the circuit 36 as appearing on line 56. Hybrid circuits 46 and 52 are again standard mixing circuits that combine the two input signals connected thereto. Accordingly, circuit 46 has two outputs as follows:

$$A+B-C-D, \text{ and}$$

$$A+B+C+D \quad (5)$$

where the first output may be measured on line 58 and is the vertical (azimuth) difference signal and the second output may be measured on line 60 and is the sum output as used in a display system for a tracking radar installation. For the hybrid circuit 52, which also a mixer, the outputs are as follows:

$$A+C-B-D \text{ and}$$

$$A+D-B-C \quad (6)$$

where the first output appears on a line 62 that terminates in a load 64. The second output is the horizontal (elevation) difference signal that may be measured on line 66.

Lines 58 and 66 are connected to separate inputs of the electronic roll circuitry 24. The vertical difference signal on line 58 is applied to the input of an amplifier 68 and the horizontal difference signal on line 66 is applied to the input of an amplifier 70. Amplifier 68 has a gain proportional to the roll angle of the antenna 10 from a reference axis, that is, proportional to $\sin \rho$. Amplifier 70 also has a gain proportional to the roll angle, that is, proportional to $\cos \rho$. Amplifiers 68 and 70 thus characterize the respective input signals applied thereto. Outputs from these amplifiers are interconnected in a manner to produce a roll stabilized vertical (azimuth) difference output on a terminal 72 for processing in a tracking radar system.

The system of FIG. 3 is a somewhat simplification of an actual tracking radar system. The input signals on the terminals 26, 28, 30 and 32 in an actual installation are received from a distributive manifold of the type illustrated and described in the U.S. Pat. No. 3,438,029 and are thus the result of combining signals from many antenna elements. Since the monopulse process is applied to the output of each quadrant of the full array of the antenna 10, a four-element analysis will be used to more fully explain the operation of roll stabilization by expansion of the previous explanation.

Figure 4:
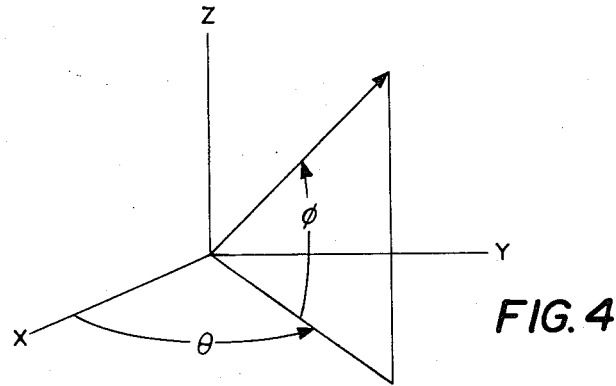
FIG. 4 illustrates azimuth-elevation pattern coordinates referenced to three mutually perpendicular axes.

Referring to FIG. 4, the $(\theta,\phi)$ coordinates are the elevation and azimuth coordinates, respectively, referenced to the $(x,y,z)$ axes, the z-axis being the local vertical. Consider also FIG. 5 where the $(\alpha,\beta)$ coordinates are the beam steering angles referenced to the $(x_a, y_a, z_a)$ coordinates, with the $y_a$ and $z_a$ axes being the row and column axes of the array. The array of elements of the antenna 10 are considered located in the ($y_a, z_a$) plane as shown in FIG. 6. The element spacing with respect to the $x_a, y_a$ axis is determined by the location of the phase center of each quadrant of the array. The standard monopulse processing network 12 forms the sum and difference signals by performing the following algebraic sums:

$$\Sigma = E_A + E_B + E_C + E_D$$

$$\Delta_\alpha = E_A + E_D - E_B - E_C$$

$$\Delta_\beta = E_A + E_B - E_C - E_D \quad (7)$$

where the subscripts indicate signals connected to the terminals 26, 28, 30 and 32. For the terminal 26, the signal appearing thereon is given by the expression:

$$E_A = \exp[j(kd \sin \alpha + kd \sin \beta)] \quad (8)$$

where $k = 2\pi/\lambda$.

Similar expressions can be written for signals from quadrants B through D of the antenna 10 as appearing on terminals 28, 30 and 32. By substituting the expressions for the signals at the terminals 26, 28, 30 and 32 into the equations at (7), expressions can be written for the sum and difference patterns in terms of the array coordinate angles ($\alpha, \beta$) as follows:

$$\Sigma(\alpha, \beta) = 2 \cos (kd \sin \alpha + kd \sin \beta) + 2 \cos (kd \sin \alpha - kd \sin \beta) \quad (9)$$

$$\Delta_\alpha(\alpha, \beta) = 2j \sin (kd \sin \alpha + kd \sin \beta) + 2j \sin (kd \sin \alpha - kd \sin \beta) \quad (10)$$

$$\Delta_\beta(\alpha, \beta) = 2j \sin (kd \sin \alpha + kd \sin \beta) - 2j \sin (kd \sin \alpha - kd \sin \beta) \quad (11)$$

From these equations it can be shown that the sum pattern has a maximum value at $\alpha$ and $\beta$ equal 0. Also, it can be shown that horizontal difference ($\Delta \alpha$) has a null along $\alpha = 0$, that is, $\Delta \alpha(0, \beta) = 0$ are all values of $\beta$. Further, it can be shown that the vertical difference ($\Delta \beta$) has a null along $\beta = 0$.

Figure 5:
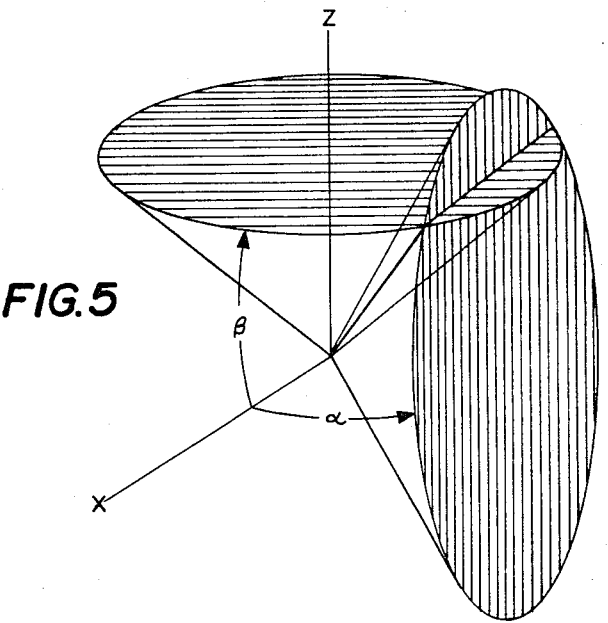
FIG. 5 are the coordinates of the beam steering angles referenced to three orthogonal axes.

From the above, an expression for a difference pattern at the terminal 72 may be written as follows:

$$\Delta \phi = \cos \rho \, \Delta \beta - \sin \rho \, \Delta \alpha \quad (12)$$

where $\phi$ is the elevation angle in the (y,z) coordinates of FIG. 5. Substituting into this expression the equations at (7) for $\Delta \alpha$ and $\Delta \beta$ gives:

$$\Delta_\phi(\alpha, \beta) = 2j[(\cos \rho - \sin \rho) \sin (kd \sin \alpha + kd \sin \beta) - (\cos \rho + \sin \rho) \sin (kd \sin \alpha - kd \sin \beta) \quad (13)$$

This expression can be converted to the ($\theta, \phi$) coordinates by substitution for sin $\alpha$ and sin $\beta$. These angles are related by the following equations:

$$\sin \alpha = \cos \rho \cos \phi \sin \theta - \sin \rho \sin \phi$$

$$\sin \beta = \sin \rho \cos \phi \sin \theta + \cos \rho \sin \phi \quad (14)$$

Substituting the equations (14) into the expression (13) results in a rather lengthly equation that can be shortened into the form:

$$\Delta_\phi(\phi, \theta) = 2j \, g \sin [kd (p \cos \phi \sin \theta + g \sin \phi)] - 2j p \sin [kd (g \cos \phi \sin \theta - p \sin \phi)] \quad (15)$$

where $p = \cos \rho + \sin \rho$, and
$g = \cos \rho - \sin \rho$.

For a zero elevation angle, that is, $\phi = 0$, this simplified expression further reduces to:

$$\Delta_\phi(\phi=0, \theta) = 2j \, g \sin [kd (p \sin \theta)] - 2j p \sin [kd (g \sin \theta)] \quad (16)$$

From equation (16), it can be shown that a roll stabilized difference pattern will diverge slightly from a perfectly aligned null position with respect to a horizontal axis. For small values of $kd \sin \theta$, however, the sine function is equal to its argument for small values of the argument, and an expression for the difference pattern appears as follows:

$$\Delta_\phi(\phi=0, \theta) = 2j \, kd \, (qp \sin \theta - pq \sin \theta) = 0 \quad (17)$$

Thus, the difference pattern ($\Delta \phi$) has a horizontal null in the region near the sum signal maximum.

Referring to FIG. 7, there is shown a typical contour plot of a roll stabilized difference pattern where the antenna 10 has a 15° roll angle from the horizontal. This contour plot is of the difference output of the electronic circuitry 24 at the terminal 72. It is a calculated plot for a simplified four-element array. The contour plot of FIG. 8 is of a pencil beam roll stabilized difference pattern for a circular aperture array of a large number of radiating elements, also for a 15° roll angle from the horizontal. FIG. 9 illustrates an elevation pattern cut through typical roll stabilized difference patterns for 5° and 15° of roll angle for the antenna. The amplitude attenuation without roll stabilization for the difference patterns would be considerably greater.

Referring to FIG. 10, there is shown one embodiment of the electronic roll circuitry 24. A vertical (azimuth) difference output from the processing network 12 is applied to an input terminal 74 of a mixer 76. The horizontal (elevation) difference signal from the processor 12 is applied to a terminal 78 of a mixer 80. The mixers 76 and 80 are supplied LO signals from a local oscillator 82. An IF, for example, 60 MHz, signal from the mixer 76 is amplified in an amplifier 84 and applied to one input of a ring modulator 86. A typical ring modulator that may be utilized is Model No. 10514A/B manufactured and sold by Hewlett-Packard. A second input to the ring modulator 86 is the output of a logarithmic amplifier 88 having an input that varies with the sine of the roll angle. The roll angle signal may be obtained from conventional hardware that produces a signal proportional to the roll of an aircraft from a horizontal reference. Similarly, an IF signal from the mixer 80 is amplified in an amplifier 90 and applied to one input of a ring modulator 92. The ring modulator 92 has a second input from a logarithmic amplifier 94 that has an input that varies with the cosine of the roll angle. Ring modulators 86 and 92 characterize the output of the mixers 76 and 80, respectively, in accordance with the second input signal applied thereto.

Referring to the previous mathematical analysis, the output of the ring modulator 86 is the second term in the right side of equation (12) and the output of the ring modulator 92 is the first term to the right of the equality sign in this equation. By combining the outputs of the ring modulators 86 and 92, the signal at the terminal 72 varies in a manner described by the difference pattern expression.

The invention has been described with emphasis on roll stabilization of the vertical (azimuth) difference pattern. As mentioned, however, with regard to FIG. 1, roll stabilization for the horizontal (elevation) difference can also be accomplished. Referring to the mathematical analysis, only the sign of the terms change. When applied to electronic circuitry, only the polarity of the signals will change between roll stabilization for a horizontal difference and a vertical difference.

While several embodiments of the invention, together with modifications thereof, have been described in detail herein and shown in the accompanying drawings, it will be evident that various further modifications are possible without departing from the scope of the invention.

What is claimed is:

1. Apparatus for stabilizing a radiation pattern from a phased array antenna oriented along a preferred axis, comprising:
   means for generating an azimuth difference signal by combining signals from selected elements of the phased array antenna,
   means for generating an elevation difference signal by combining signals from selected elements from the phased array antenna,
   means for generating an azimuth correction signal and an elevation correction signal each related to the deviation of the phased array antenna from a preferred axis of orientation,
   means for modifying the azimuth difference signal by the azimuth correction signal of said generating means,
   means for modifying the elevation difference signal by the elevation correction signal of said generating means, and
   means for combining the modified signals into a radiation pattern roll stabilized along a preferred axis.

2. Apparatus for stabilizing a radiation pattern from a phased array antenna oriented along a preferred axis as set forth in claim 1 wherein said means for modifying the azimuth difference signal includes a fixed gain amplifier having an input connected to the azimuth difference signal and having its output connected to a ring modulator responsive to the azimuth correction signal of said generating means for modifying the azimuth signals.

3. Apparatus for stabilizing a radiation pattern from a phased array antenna oriented along a preferred axis as set forth in claim 2 wherein said means for modifying the elevation difference signal includes a fixed gain amplifier connected to said means for generating the elevation difference signal and having its output connected to a ring modulator responsive to the elevation correction signal for modifying the elevation difference signal.

4. Apparatus for stabilizing a radiation pattern from a phased array antenna oriented along a preferred axis as set forth in claim 3 wherein said generating means produces an azimuth correction signal that varies as the sine of the angle of deviation of the receiving antenna from a preferred orientation and an elevation correction signal equal to the cosine of the angle of deviation of the receiving antenna from the preferred orientation.

5. Apparatus for stabilizing a radiation pattern from a phased array antenna oriented along a preferred axis as set forth in claim 1 wherein said means for modifying the azimuth difference signal includes an amplifier having a gain that varies in accordance with the azimuth correction signal for modifying the first signal and wherein said means for modifying the elevation difference signal includes a second amplifier having a gain that varies in accordance with the elevation correction signal for modifying the second signal.

6. A method for stabilizing a radiation pattern from a phased array antenna oriented along a preferred axis, comprising:
   generating an azimuth difference signal by combining signals from selected elements of the phased array antenna,
   generating an elevation difference signal by combining signals from selected elements of the phased array antenna, and
   modifying the azimuth difference signal and the elevation difference signal in accordance with the deviation of the phased array antenna from a preferred orientation and combining the modified signals into a stabilized radiation pattern signal oriented along a preferred axis.

7. A method for stabilizing a radiation pattern oriented along a preferred axis as set forth in claim 6 including the step of generating an azimuth correction signal and an elevation correction signal each related to the deviation of the phased array antenna from a preferred axis of orientation for modifying the azimuth and elevation difference signals.

8. Apparatus for stabilizing a radiation pattern from a receiving antenna oriented along a preferred axis, comprising:
   means for generating a first radiation difference signal along a first axis by combining signals from sections of the receiving antenna,
   means for generating a second radiation difference signal along an axis orthogonal to said first axis by combining signals from sections of the receiving antenna, and
   means for modifying said first and second signals by a correction signal and for combining the modified signals to form a stabilized radiation pattern signal oriented along a preferred axis, said means for modifying including
   a first amplifier having a gain that varies in accordance with the deviation of the receiving antenna from a preferred orientation for modifying said first signal, and
   a second amplifier also having a gain that varies in accordance with the deviation of the receiving antenna from a preferred orientation for modifying said second signal and having an output connected to the output of said first amplifier.

9. Apparatus for stabilizing a radiation pattern from a receiving antenna oriented along a preferred axis, comprising:
   means for generating a first radiation difference signal along a first axis by combining signals from sections of the receiving antenna,
   means for generating a second radiation difference signal along an axis orthogonal to said first axis by combining signals from sections of the receiving antenna, and
   means for modifying said first and second signals by a correction signal and for combining the modified signals to form a stabilized radiation pattern signal oriented along a preferred axis, said means for modifying including a first ring modulator connected to the output of a fixed gain amplifier and responsive to the signal that varies with the deviation of the receiving antenna from a preferred orientation for modifying said first signal, and a second ring modulator connected to a fixed gain amplifier and responsive to the signal that varies with the deviation of the receiving antenna from a preferred orientation for modifying the second signal and having an output connected to the output of said first ring modulator.

10. Apparatus for stabilizing a radiation pattern from a receiving antenna oriented along a preferred axis, comprising:

means for generating a first radiation difference signal along a first axis by combining signals from sections of the receiving antenna, means for generating a second radiation difference signal along an axis orthogonal to said first axis by combining signals from sections of the receiving antenna, and means for modifying said first and second signals by a correction signal related to the sine and cosine, respectively, of the angle of deviation of the receiving antenna from a preferred orientation and for combining the modified signals to form a stabilized radiation pattern signal oriented along a preferred axis.

* * * * *